G. H. GARCELON.
PULLEY.
APPLICATION FILED JULY 9, 1913.
1,266,579.
Patented May 21, 1918.
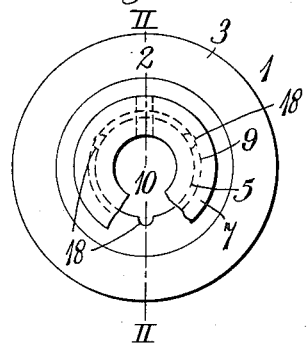
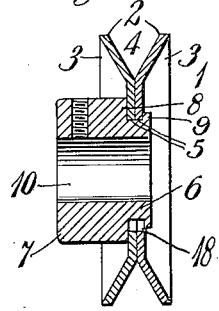
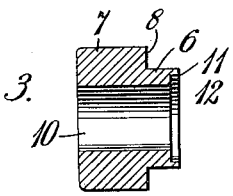
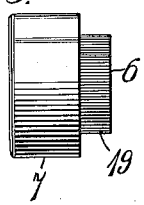
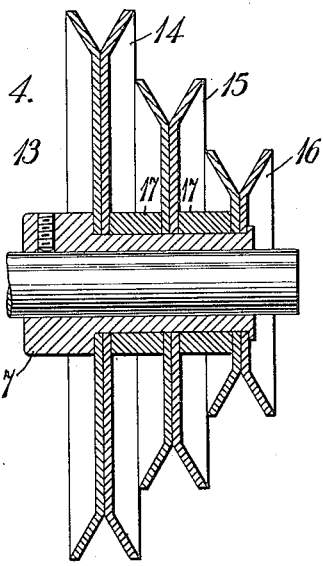
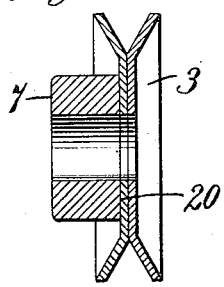
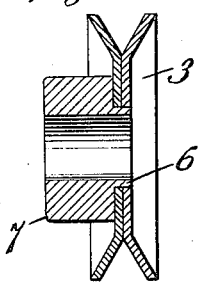
WITNESSES:
Fred H. Miller
J. P. Langley
INVENTOR
George H. Garcelon
BY
Wesley G. Carr
ATTORNEY

UNITED STATES PATENT OFFICE.

GEORGE H. GARCELON, OF SWISSVALE, PENNSYLVANIA, ASSIGNOR TO WESTINGHOUSE ELECTRIC AND MANUFACTURING COMPANY, A CORPORATION OF PENNSYLVANIA.

PULLEY.

1,266,579.      Specification of Letters Patent.      Patented May 21, 1918.

Application filed July 9, 1913. Serial No. 778,090.

*To all whom it may concern:*

Be it known that I, GEORGE H. GARCELON, a citizen of the United States, and a resident of Swissvale, in the county of Allegheny and State of Pennsylvania, have invented a new and useful Improvement in Pulleys, of which the following is a specification.

My invention relates to pulleys, and it has for its object to provide a device of this character that shall be simple, durable and inexpensive in construction. A further object of my invention is to provide a structure which comprises a small number of standard or stock parts that are common to similar pulleys for various speed ratios and are applicable to shafts of different diameters.

In the use of pulleys where various speed ratios or combinations of speed ratios are selectively expedient, it has been customary to carry a relatively large stock of pulleys of various sizes, each pulley being a unit in itself, and each kind of pulley requiring a different course of manufacture.

In the manufacture of my device, I provide standard or stock parts that are readily adaptable, in combination, to form various sizes and kinds of pulleys. By means of this construction, I am able to reduce the amount of material necessary to be carried in stock and to materially cheapen the cost of manufacture.

In the accompanying drawings, Figure 1 is an end view of a single pulley constructed in accordance with my invention, parts being broken away; Fig. 2 is a sectional view on line II—II in Fig. 1; Fig. 3 is a sectional view of one of the parts shown in Figs. 1 and 2; Fig. 4 is a sectional view of a combination or step pulley; Fig. 5 is a side view in elevation of a modification of the hub shown in Fig. 3; and Figs. 6 and 7 are sectional views of modifications of my invention.

Referring to Figs. 1 and 2, the pulley here shown comprises a wheel member 1 composed of two pressed cup shaped disks 2, the flange portions 3 of which diverge to form the usual groove or belt race 4. The disks 2 are provided with openings 5, of uniform standard diameter for similar disks of various external diameters to fit a reduced portion 6 of a standard or stock hub 7, the main portion of which provides a shoulder 8 against which the inner pulley member rests. The reduced portion 6 projects beyond the disks 2 to provide material for upsetting to form a retaining flange 9. The hub 7 is of sufficient diameter to permit the drilling of a hole 10 of suitable diameter to fit the shaft for which it is intended. In case the hole 10 is of such diameter that the reduced portion 6 is too thick for readily forming the retaining flange 9, a suitable flange 11 for upsetting may be readily provided by counterboring the hub 7 as indicated at 12 in Fig. 3.

The disks 3 are provided with grooves 18 to receive a portion of the metal of the hub 7 or of bushings when the latter are used. This arrangement provides a rigid construction for preventing relative movement of the disks 3 and the hub 7.

Fig. 4 shows a step pulley 13 provided with three wheel members 14, 15 and 16. The construction is the same as that of the single pulley, except that standard collars or bushings 17 are placed on the hub 7 between the several pulley members, to space them apart.

A modified form of hub is shown in Fig. 5. The reduced portion 6 of the hub 7 is knurled as indicated at 19. The disks 3 may be pressed upon the reduced portion 6 and held from relative rotation thereon by the projections of the knurled portion.

In Figs. 6 and 7, I have shown a construction which may be produced by spot welding the disks 3 upon the hub 7. In the arrangement shown in Fig. 6, the disks 3 are welded directly to the end face 20 of the hub 7 which is not reduced. Fig. 7 shows a hub 7 with a reduced portion 6 upon which the disks are placed and then welded as in the form shown in Fig. 6. The advantages of the welding process are that the pulley is easily and quickly assembled and the construction is rigid and permanent.

It is evident from the foregoing disclosure that, with a small stock of standard parts, pulleys may be formed in many sizes and combinations. As the disk members may be made by pressing, and the hubs and spacing collars by automatic machines, it is obvious that the cost of manufacture may be materially reduced by the method hereinbefore set forth.

Various modifications may be effected without exceeding the spirit and scope of my invention.

I claim as my invention:

1. A pulley comprising a hub member of uniform diameter and a plurality of wheels mounted thereon in spaced relation, each embodying oppositely disposed cup-shaped disks.

2. A pulley comprising a hub member of uniform diameter and a plurality of wheels mounted thereon in spaced relation, each embodying oppositely disposed disks of pressed material.

3. A pulley comprising a hub member of uniform diameter and a plurality of wheels of different diameters mounted thereon, each embodying oppositely disposed pressed disks.

4. A pulley comprising a hub member of uniform diameter and a plurality of wheels of different diameters mounted thereon, each embodying oppositely disposed cup-shaped disks.

5. A pulley comprising a hub member of uniform diameter and a plurality of wheels mounted thereon in spaced relation, each embodying cup-shaped disks.

6. A pulley comprising a hub member of uniform diameter and a plurality of wheels mounted thereon in spaced relation, each embodying disks of pressed material.

7. A pulley comprising a hub member of uniform diameter, and a plurality of wheels mounted thereon and embodying pressed disks having diameters of different lengths.

8. A pulley comprising a hub member of uniform diameter, and a plurality of wheels mounted thereon and embodying cup-shaped disks having diameters of different lengths.

9. A pulley comprising a hub member of uniform diameter, a plurality of wheels, each embodying oppositely disposed cup-shaped disks mounted thereon, and means for spacing said wheels from each other.

10. A pulley comprising a hub member, a plurality of wheels, each embodying oppositely disposed cup-shaped disks mounted thereon, and bushings for separating said wheels.

11. The combination with a cylindrical hub member having a reduced portion and a shoulder, of a plurality of wheel members on said reduced portion, each of said wheel members comprising two oppositely-disposed cup-shaped pressed disks, a plurality of bushings for spacing said wheel members from each other, and an upturned flange integral with said reduced portion for rigidly clamping said wheel members in position.

12. The combination with a cylindrical hub member having a reduced portion and a shoulder, of a plurality of wheel members spaced from each other on said reduced portion, and each of said wheel members comprising two oppositely-disposed cup-shaped pressed disks, and an upturned flange on said reduced portion for rigidly clamping said wheel members in position.

In testimony whereof, I have hereunto subscribed my name this 3rd day of July, 1913.

GEORGE H. GARCELON.

Witnesses:
B. B. HINES,
M. C. MERZ.